//

US009285462B2

(12) United States Patent
Nakabayashi et al.

(10) Patent No.: US 9,285,462 B2
(45) Date of Patent: Mar. 15, 2016

(54) ANTENNA APPARATUS

(75) Inventors: Kento Nakabayashi, Anjo (JP);
Kazuma Natsume, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 276 days.

(21) Appl. No.: 13/441,110

(22) Filed: Apr. 6, 2012

(65) Prior Publication Data
US 2012/0256784 A1 Oct. 11, 2012

(30) Foreign Application Priority Data
Apr. 6, 2011 (JP) .................................. 2011-084564

(51) Int. Cl.
*G01S 7/03* (2006.01)
*G01S 13/93* (2006.01)
(Continued)

(52) U.S. Cl.
CPC ............... *G01S 7/032* (2013.01); *G01S 13/931* (2013.01); *H01Q 3/26* (2013.01); *H01Q 21/0093* (2013.01); *H01Q 21/065* (2013.01); *G01S 13/4463* (2013.01); *G01S 2013/9375* (2013.01)

(58) Field of Classification Search
CPC .... G01S 13/4454; G01S 7/032; H01Q 21/065
USPC .......................................................... 342/153
See application file for complete search history.

(56) References Cited

U.S. PATENT DOCUMENTS 5,952,973 A 9/1999 Uematsu et al.
6,067,048 A 5/2000 Yamada
(Continued)

FOREIGN PATENT DOCUMENTS

JP 09-270635 10/1997
JP 11-231040 8/1999
(Continued)

OTHER PUBLICATIONS
Office action dated May 14, 2013 in corresponding Japanese Application No. 2011-084564.
(Continued)

*Primary Examiner* — Matthew M Barker
(74) *Attorney, Agent, or Firm* — Harness, Dickey & Pierce, P.L.C.

(57) ABSTRACT

In an antenna apparatus, a transmitting antenna includes transmitting-side unit antennas arranged in an arranging-direction at transmitting-side arrangement intervals. Receiving antennas are arranged in the arranging-direction at arrangement intervals. Each of the receiving antennas includes receiving-side unit antennas arranged in the arranging-direction at receiving-side arrangement intervals. The receiving-side arrangement interval is larger than the transmitting-side arrangement interval. A transmission- and reception composition characteristic, which is a composition of directivities of the transmitting antenna and receiving antenna, has a main lobe including a detection angle range. The transmitting-side arrangement interval and the receiving-side arrangement interval are determined so that, in the detection angle range, a ratio of the intensity of the main lobe of the transmission-and-reception composition characteristic at a given angle in the detection angle range to the intensity of the transmission-and-reception composition characteristic generated as a false image at the angle by wrap around becomes not less than a threshold.

2 Claims, 4 Drawing Sheets

(51) Int. Cl.
  *H01Q 3/26* (2006.01)
  *H01Q 21/00* (2006.01)
  *H01Q 21/06* (2006.01)
  *G01S 13/44* (2006.01)

(56) References Cited

U.S. PATENT DOCUMENTS

| | | | |
|---|---|---|---|
| 7,132,976 B2 * | 11/2006 | Shinoda et al. | 342/70 |
| 8,665,137 B2 * | 3/2014 | Wintermantel | 342/59 |
| 2006/0158369 A1 | 7/2006 | Shinoda et al. | |
| 2006/0262007 A1 * | 11/2006 | Bonthron et al. | 342/70 |
| 2007/0182619 A1 * | 8/2007 | Honda et al. | 342/80 |
| 2008/0100510 A1 * | 5/2008 | Bonthron et al. | 342/373 |
| 2009/0046000 A1 | 2/2009 | Matsuoka | |
| 2010/0019954 A1 | 1/2010 | Mizutani et al. | |
| 2011/0063158 A1 * | 3/2011 | Kondou | 342/27 |
| 2011/0298653 A1 * | 12/2011 | Mizutani et al. | 342/147 |

FOREIGN PATENT DOCUMENTS

| | | | | |
|---|---|---|---|---|
| JP | 2003110335 A * | 4/2003 | | H01Q 3/36 |
| JP | 2004-104383 | 4/2004 | | |
| JP | 2005-094440 | 4/2005 | | |
| JP | 2009-047510 | 3/2009 | | |
| JP | 2009-076986 | 4/2009 | | |
| JP | 2010-032314 | 2/2010 | | |
| JP | 2010-273049 | 12/2010 | | |
| JP | 2011-064584 | 3/2011 | | |

OTHER PUBLICATIONS

Office action dated May 14, 2013 in corresponding Japanese Application No. 2011-084565.

Office Action dated Sep. 29, 2014 in corresponding Chinese Application No. 2012 10100220.2.

* cited by examiner

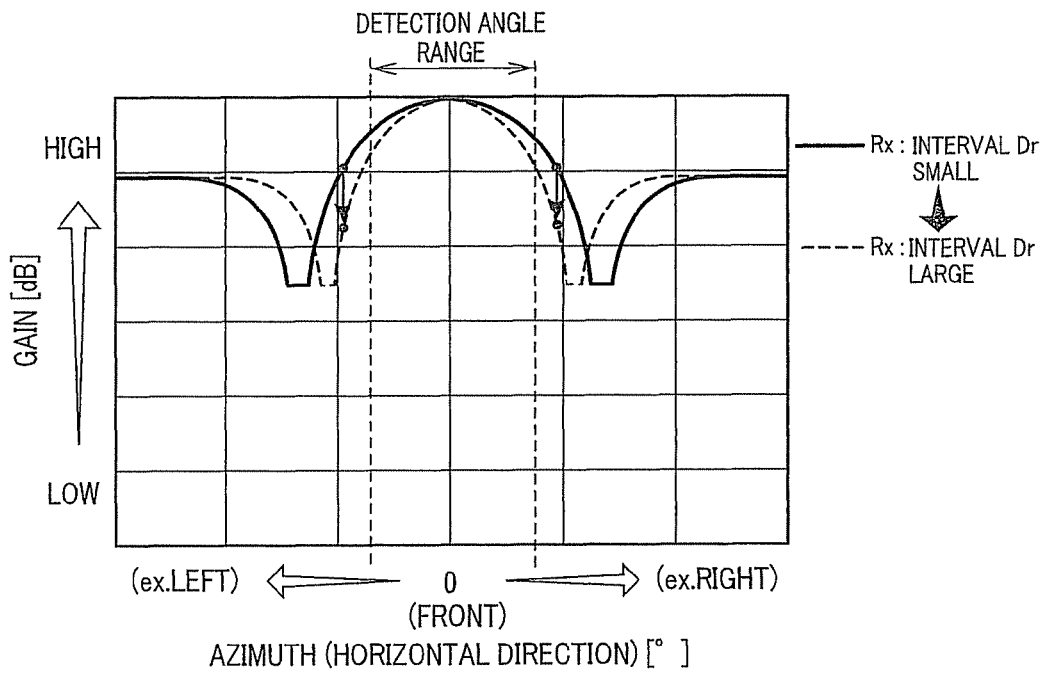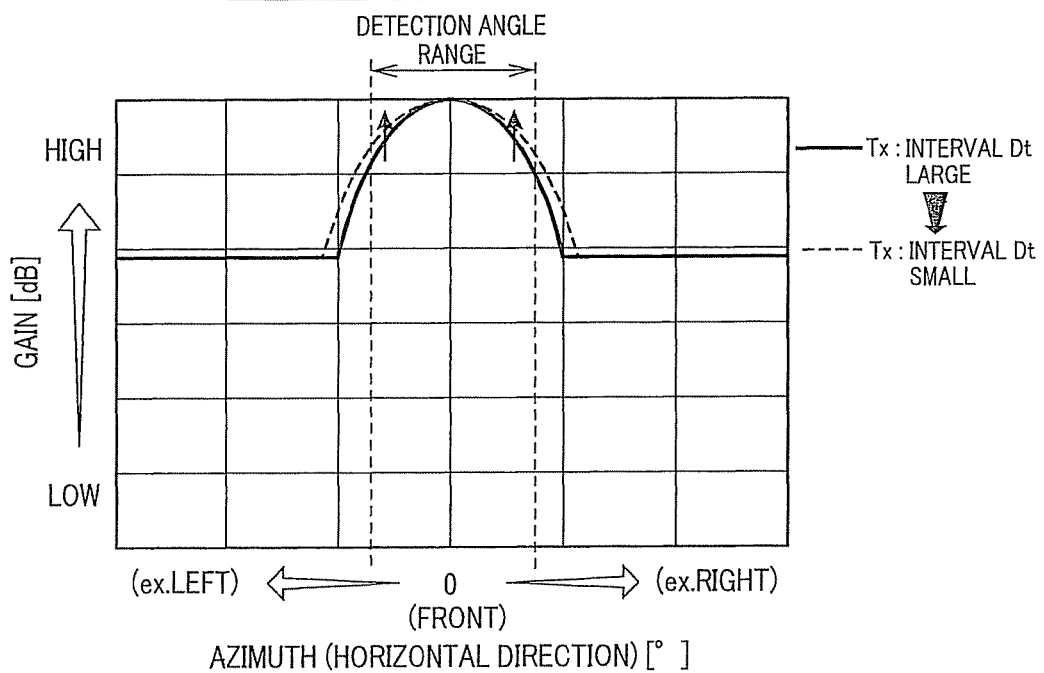

ANTENNA APPARATUS

CROSS-REFERENCE TO RELATED APPLICATION

This application is based on and claims the benefit of priority from earlier Japanese Patent Application No. 2011-84564 filed Apr. 6, 2011, the description of which is incorporated herein by reference.

BACKGROUND

1. Technical Field

The present invention relates to an antenna apparatus applied to a radar apparatus which detects an azimuth of a target.

2. Related Art

Conventionally, a so-called phase mono-pulse method radar apparatus is known in which a plurality of (multiple-channel) receiving antennas receive waves which are radiated from a transmitting antenna and reflected from a target. The radar apparatus detects an azimuth of the target based on phase differences between signals of respective channels received by the receiving antennas.

However, when detecting the azimuth by using the phase difference, so-called phase wrap around (grating) is generated based on the fact that a phase difference $\Delta\phi$ and $\Delta\phi \pm 360n°$ (n is a natural number) cannot be distinguished from each other. Hence, due to the false image generated by the phase wrap around, a target located outside a range, in which the phase difference changes by 360° (e.g. $-180° < \Delta\phi \leq 180°$ of the range of the azimuth), is erroneously detected as a target which is located within the range.

To solve the above problem, various methods are proposed for preventing erroneous detection due to the phase wrap around. For example, in JP-A-2010-32314, a technique is disclosed which suppresses the grating by unequalizing intervals between the plurality of receiving antennas. In addition, in JP-A-2009-76986, a technique is disclosed in which adjacent receiving antennas of a plurality of receiving antennas share an array which forms each of the receiving antennas.

However, according to the technique disclosed in JP-A-2010-32314, since the receiving antennas are arranged at unequal intervals, a unintended and undesired wave is generated under the specific condition. According to the technique disclosed in JP-A-2009-76986, part of a plurality of arrays forming a receiving antenna are shared by another adjacent receiving antenna, isolation between the adjacent receiving antennas deteriorates. In addition, since the part of the arrays is shared, designing and manufacturing the antenna becomes complicated.

Note that, to prevent the erroneous detection due to the phase wrap around, the interval between receiving antennas of respective channels is shortened in general. From a viewpoint of the resolution for detecting an azimuth angle, the width of the whole receiving antenna is preferred to be larger. However, to prevent the erroneous detection due to the phase wrap around while realizing high resolution, the number of the receiving antennas (the number of channels) is required to be larger, which increases the manufacturing cost.

SUMMARY

An embodiment provides an antenna apparatus which can suppress the influence of phase wrap around (false image) at least within a detection angle range which is an angle range for a detection object of an azimuth to detect an azimuth with high precision by a simple (low cost) configuration.

As an aspect of the embodiment, an antenna apparatus is provided which includes: a transmitting antenna and a plurality of receiving antennas, the antenna apparatus being used for an azimuth detection apparatus, in which each of the receiving antennas receives radio waves transmitted from the transmitting antenna and reflected by an object and an azimuth of the object is detected based on a phase difference between received signals, wherein the transmitting antenna includes a plurality of transmitting-side unit antennas arranged in a predetermined arranging direction at predetermined transmitting-side arrangement intervals, the plurality of receiving antennas are arranged in the arranging direction at predetermined arrangement intervals, each of the receiving antennas includes a plurality of receiving-side unit antennas arranged in the arranging direction at predetermined receiving-side arrangement intervals, the receiving-side arrangement interval is larger than the transmitting-side arrangement interval, a transmission and reception composition characteristic, which is a composition of a directivity of the transmitting antenna and a directivity of the receiving antenna, has a main lobe including at least the whole of a predetermined detection angle range, and the transmitting-side arrangement interval and the receiving-side arrangement interval are determined so that, in the whole of the detection angle range, a ratio of the intensity of the main lobe of the transmission and reception composition characteristic at a given angle in the detection angle range to the intensity of the transmission and reception composition characteristic generated as a false image at the angle by wrap around at the angle due to grating becomes equal to or more than a predetermined threshold value.

BRIEF DESCRIPTION OF THE DRAWINGS

In the accompanying drawings:

FIGS. 3A and 3B are views for explaining a specific method of reducing influence of phase wrap around (false image), the method being realized by the antenna apparatus of the embodiment.

DETAILED DESCRIPTION OF THE PREFERRED EMBODIMENTS

With reference to the accompanying drawings, hereinafter is described an embodiment of the present invention.

Figure 1:
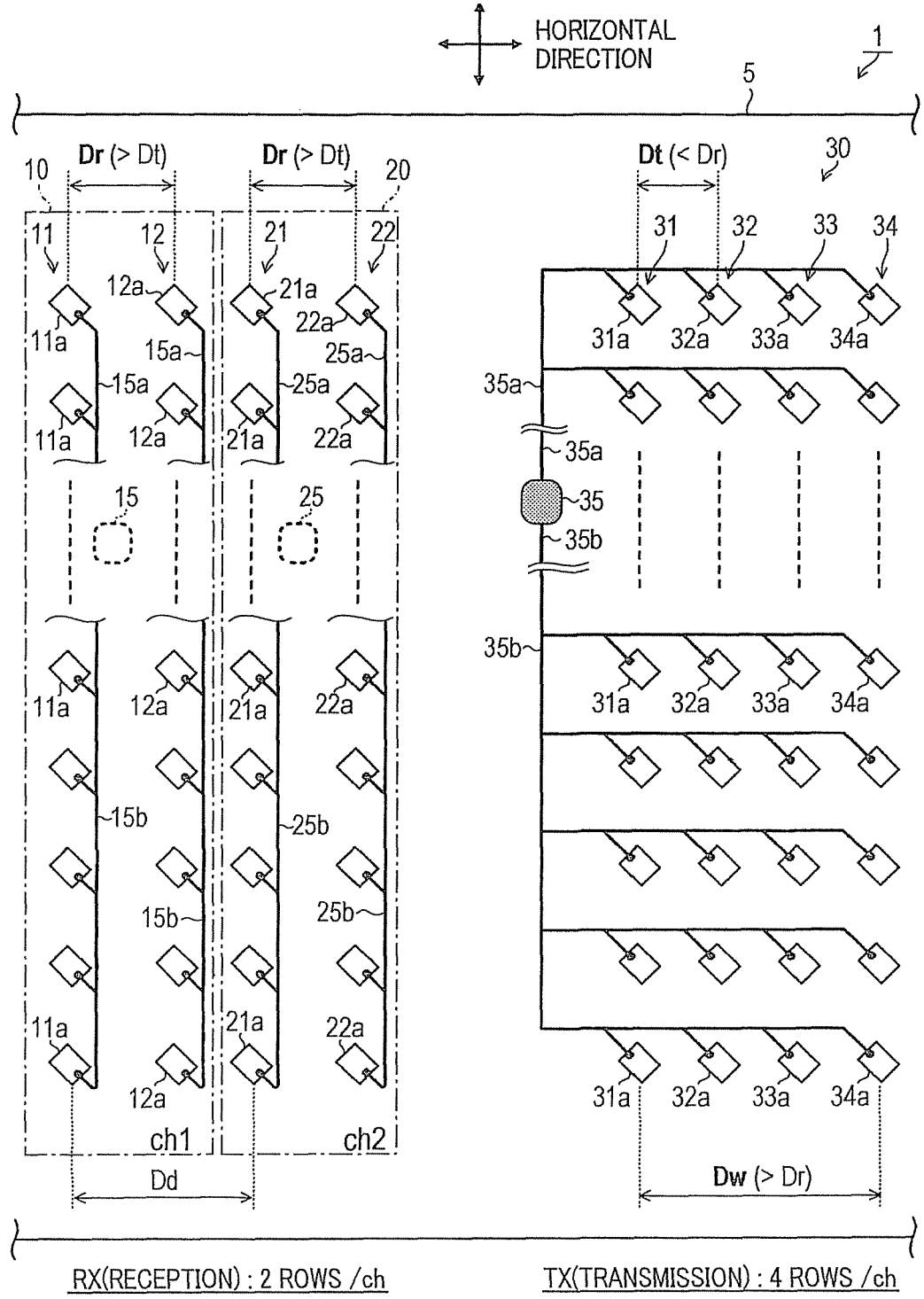
FIG. 1 is a view showing a schematic configuration of an antenna apparatus of an embodiment.

FIG. 1 shows a schematic configuration of an antenna apparatus 1 of the embodiment. The antenna apparatus 1 is used in an in-vehicle radar apparatus using a phase mono-pulse method (azimuth detection apparatus). The antenna apparatus 1 mainly includes a transmitting antenna 30, a plurality of (two in the embodiment) receiving antennas 10, 20. The receiving antennas 10, 20 configure respective reception channels (channel 1 and channel 2).

Since the configuration and operation of the in-vehicle radar apparatus using the phase mono-pulse method are known, a brief overview thereof will be described.

The in-vehicle radar apparatus using the antenna apparatus 1 of the present embodiment includes a high-frequency signal generating unit and a transmitting circuit unit. The high-frequency signal generating unit generates a high-frequency signal of the millimeter waveband (e.g. 76 GHz to 77 GHz). The transmitting circuit unit distributes power of the high-frequency signal generated by the high-frequency signal generating unit, and generates a transmission signal provided to the transmitting antenna 30 of the antenna apparatus 1 and a local signal provided to a receiving circuit unit described later. The transmission signal provided to the transmitting antenna 30 is transmitted from the transmitting antenna 30 ahead of the vehicle by a radio wave.

In addition, the in-vehicle radar apparatus includes a receiving circuit unit and a signal processor. The receiving circuit unit mixes the local signal into the signals received by the respective receiving antennas 10, 20 of the antenna apparatus 1 (i.e. a wave transmitted from the transmitting antenna 30 and reflected by a target existing ahead of the vehicle) to generate beat signals for the respective received signal (for channels) sent from the receiving antennas 10, 20. The signal processor obtains information (azimuth, relative velocity, distance and the like) on the target having reflected a radar wave (transmission radio wave), based on, for example, the phase difference of beat signals of the respective channels generated by the receiving circuit unit.

Note that the transmitting circuit unit and the receiving circuit unit having the above functions are well known. Each of the transmitting circuit unit and the receiving circuit unit is configured as one chip MMIC (monolithic microwave integrated circuit).

As shown FIG. 1, the antenna apparatus 1 has a formation in which the two receiving antennas 10, 20 and the transmitting antenna 30 are formed on one of the both surfaces of a dielectric substrate 5. Each of the receiving antennas 10, 20 and the transmitting antenna 30 is formed of a strip conductor. A ground plate formed of a conductor is formed on the other of the surfaces of the dielectric substrate 5.

The transmitting antenna 30 has a configuration in which four transmitting-side unit antennas 31, 32, 33, 34 are arranged in the horizontal direction (corresponding to an arranging direction) at predetermined transmitting-side arrangement intervals Dt.

The transmitting-side unit antenna 31 is closest to the receiving antenna 20 among the transmitting-side unit antennas 31, 32, 33, 34. The transmitting-side unit antenna 31 has a configuration in which a plurality of rectangular radiating elements 31a are arranged in the vertical direction orthogonal to the horizontal direction at predetermined intervals. That is, the transmitting-side unit antenna 31 is configured as a microstrip array antenna in which the plurality of rectangular radiating elements 31a are arranged in an array in the vertical direction.

Each of the rectangular radiating elements 31a is arranged so that the longer side direction thereof is inclined with respect to the vertical direction at a predetermined angle.

The other three transmitting-side unit antennas 32, 33, 34 have the same configuration as that of the transmitting-side unit antenna 31 described above. The transmitting-side unit antennas 32 is arranged next to the transmitting-side unit antenna 31 at the transmitting-side arrangement interval Dt therefrom. The transmitting-side unit antenna 32 is configured as a microstrip array antenna in which the plurality of rectangular radiating elements 32a are arranged in an array in the vertical direction. The transmitting-side unit antenna 33 is arranged next to the transmitting-side unit antenna 32 at the transmitting-side arrangement interval Dt therefrom. The transmitting-side unit antenna 33 is configured as a microstrip array antenna in which the plurality of rectangular radiating elements 33a are arranged in an array in the vertical direction. The transmitting-side unit antennas 34 are arranged next to the transmitting-side unit antenna 33 at the transmitting-side arrangement interval Dt therefrom. That is, the transmitting-side unit antenna 34 is the farthest from the receiving antenna among the transmitting-side unit antennas 31, 32, 33, 34. The transmitting-side unit antenna 34 is configured as a microstrip array antenna in which the plurality of rectangular radiating elements 34a are arranged in an array in the vertical direction.

Hence, the width of the whole four transmitting-side unit antennas 31, 32, 33, 34 (the width in the horizontal direction, hereinafter, referred to as "transmitting antenna width") Dw is three times as long as the transmitting-side arrangement interval Dt which is the arrangement interval between the transmitting-side unit antennas.

The four transmitting-side unit antennas 31, 32, 33, 34 configuring the transmitting antenna 30 are connected to a transmitting-side feeding point 35 via transmitting-side feeding lines 35a, 35b. More specifically, the transmitting-side feeding point 35 is at the substantially intermediate position in the vertical direction of the transmitting antenna 30. The transmitting-side feeding line 35a extends upward (upper direction in FIG. 1) from the transmitting-side feeding point 35 and is connected to the radiating elements 31a, 32a, 33a, 34a positioned above the transmitting-side feeding point 35 (that is, the transmitting-side feeding line 35a is connected to the transmitting-side unit antennas 31, 32, 33, 34). In addition, the transmitting-side feeding line 35b extends downward (lower direction in FIG. 1) from the transmitting-side feeding point 35 and is connected to the radiating elements 11a, 12a positioned below the transmitting-side feeding point 35.

The receiving antennas 10, 20 are arranged in the horizontal direction at a predetermined arrangement interval Dd.

In the receiving antennas 10 (reception channel: channel 1), which is farther from the transmitting antenna 30 than the receiving antenna 20s, two receiving-side unit antennas 11, 12 are arranged in the horizontal direction at a predetermined receiving-side arrangement interval Dr.

The receiving-side unit antennas 11, 12 configuring one receiving antenna 10 have the same formation. The receiving-side unit antenna 11 (which is farther from the transmitting antenna 30) has a formation in which the plurality of rectangular radiating elements 11a are arranged in the vertical direction at predetermined intervals. That is, the receiving-side unit antenna 11 is configured as a microstrip array antenna in which the plurality of radiating elements 11a are arranged in an array in the vertical direction. Each of the rectangular radiating elements 11a is arranged so that the longer side direction thereof is inclined with respect to the vertical direction at a predetermined angle.

That is, the receiving-side unit antenna 11 has the same formation as those of the transmitting-side unit antennas 31, 32, 33, 34 configuring the transmitting antenna 30. Note that it is not essential that the receiving-side unit antenna and the transmitting-side unit antenna have the same formation. The receiving-side unit antenna and the transmitting-side unit antenna may have formations different from each other.

The receiving-side unit antenna 12 has the same configuration as described above. The receiving-side unit antenna 12 is configured as a microstrip array antenna in which the plurality of rectangular radiating elements 12a are arranged in an array in the vertical direction.

The two receiving-side unit antennas 11, 12 configuring the receiving antenna 10 are connected to a first receiving-side feeding point 15 via receiving-side feeding lines 15a, 15b. More specifically, the first receiving-side feeding point 15 is at the substantially intermediate position in the vertical direction of the receiving antenna 10. The receiving-side feeding line 15a extends upward (upper direction in FIG. 1) from the receiving-side feeding point 15 and is connected to the radiating elements 11a, 12a positioned above the receiving-side feeding point 15. In addition, the receiving-side feeding line 15b extends downward (lower direction in FIG. 1) from the receiving-side feeding point 15 and is connected to the radiating elements 11a, 12a positioned below the receiving-side feeding point 15.

The receiving antenna 20 (reception channel: channel 2) has the same configuration as described above in which two receiving-side unit antennas 21, 22 are arranged in the horizontal direction at a receiving-side arrangement interval Dr. The specific configurations of the receiving-side unit antennas 21, 22 are the same as those of the receiving-side unit antennas 11, 12 configuring the receiving antenna 10. The configurations of feeding lines 25a, 25b connected to the receiving-side unit antennas 21, 22 are the same as those of the receiving-side feeding lines 15a, 15b.

In the same manner as in the receiving antennas 10, 20 and the transmitting antenna 30, the feeding lines 15a, 15b, 25a, 25b, 35a, 35b are also formed of strip conductors. The feeding lines 15a, 15b, 25a, 25b, 35a, 35b are formed on one surface of the dielectric substrate 5, that is, the surface on which the receiving antennas 10, 20 and the transmitting antenna 30 are formed.

The antenna apparatus 1 configured as described above is installed in the in-vehicle radar apparatus as a component (module) configuring the in-vehicle radar apparatus. The in-vehicle radar apparatus is mounted on the front end side of the vehicle so that the vertical direction of the antenna apparatus 1 (the direction in which the radiating elements are arranged) agrees with the up-and-down direction of the vehicle and the horizontal direction of the antenna apparatus 1 (the direction in which the unit antennas are arranged) agrees with the right-and-left direction of the vehicle (i.e. the direction parallel to the ground and perpendicular to the longitudinal direction (front direction) of the vehicle). In this condition, the antenna apparatus 1 is used.

The configuration of the antenna apparatus 1 of the present embodiment is characterized by the relationship between the transmitting-side arrangement interval Dt, which is the interval between the transmitting-side unit antennas 31, 32, 33, 34 forming the transmitting antenna 30, and the receiving-side arrangement interval Dr, which is the interval between the receiving-side unit antennas 11, 12 (21, 22) forming the receiving antenna 10 (20).

Specifically, in the present embodiment, a magnitude relation is met as shown in the following expression (1).

$$Dr > Dt \qquad (1)$$

Since the antenna apparatus 1 is configured so as to meet the condition (magnitude relation) of the expression (1), when the antenna apparatus 1 is used in the in-vehicle radar apparatus, the influence of a false image due to the phase wrap around (grating) is suppressed in a predetermined detection angle range in which the azimuth of a target and the like should be detected with high precision, whereby preventing erroneous detection.

Note that, in the present embodiment, the relation between the receiving-side arrangement interval Dr and the width of the transmitting antenna Dw is met as shown in the following expression (2).

$$Dr < Dw \qquad (2)$$

The reason will be described why the influence of a false image (erroneous detection) can be suppressed in the detection angle range by meeting the above expression (1), with reference to FIGS. 2 and 3.

Figure 2:
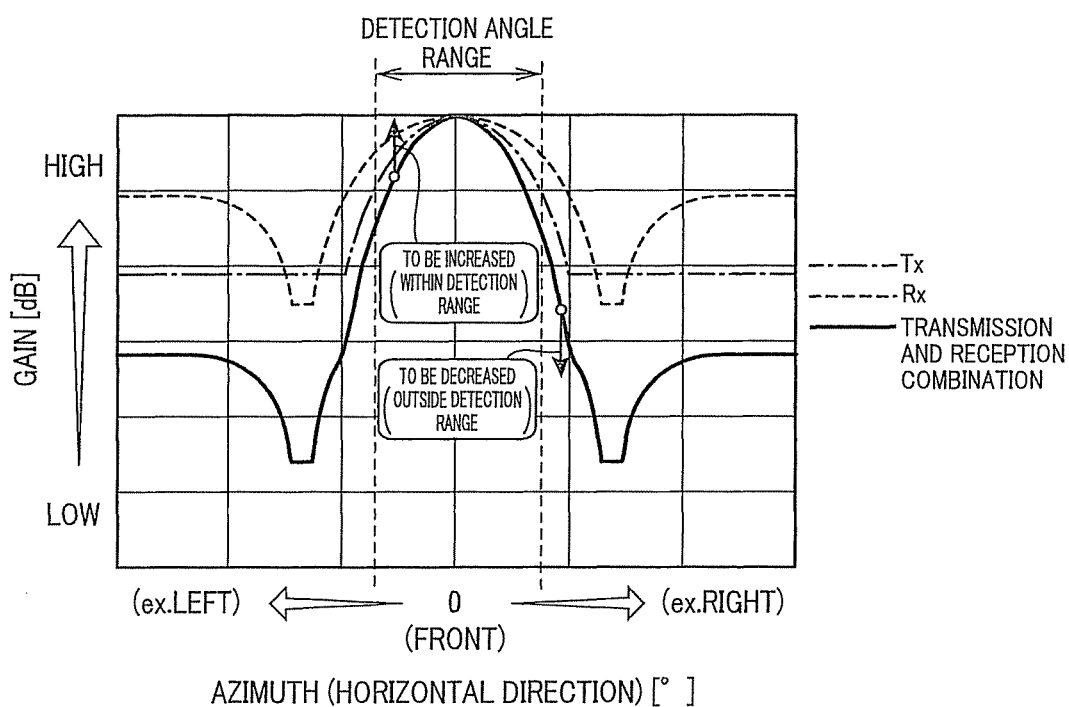
FIG. 2 is a view for explaining a method of reducing influence of phase wrap around (false image), the method being realized by the antenna apparatus of the embodiment.

FIG. 2 shows an example of directivities of an antenna apparatus having the same configuration as that of the antenna apparatus 1 of the present embodiment (however, the intervals Dr, Dt are optional). In FIG. 2, directivities of the antenna apparatus include a directivity of the transmitting antenna (indicated by an alternate long and short dash line in FIG. 2), a directivity of the receiving antenna (e.g. the receiving antenna of channel 1) (indicated by a broken line in FIG. 2), and a transmission and reception composition directivity (indicated by a solid line in FIG. 2) which is the composition of directivities (gains) of the transmitting antenna and the receiving antenna.

In addition, the front direction of the vehicle is set to the azimuth 0° in the horizontal direction. The range of a predetermined azimuth angle in the right-and-left direction of the vehicle centering on the azimuth 0° is set as a detection angle range in which a target should be detected with high precision.

To detect the azimuth of the target with high precision in the detection angle range while suppressing the influence of the false image generated by the phase wrap around, having no false image at all would be ideal. However, it is almost impossible.

Meanwhile, even when a few false images are generated at a given angle in the detection angle range, the influence of the false image can be suppressed if a transmission and reception composition gain of an original transmission and reception radio wave (desired wave) at the angle is relatively large with respect to the false image. That is, even if some absolute level of a undesired wave exists which is an imaginary transmission and reception radio wave generating a false image at the angle (transmission and reception radio wave wrapped-around to the angle as a false image), the influence of the false image can be suppressed as a result if the level of the desired wave is relatively large with respect to the undesired wave.

That is, if a DU ratio, which is a ratio of a desired wave and a undesired wave, can be made larger, the influence of a false image can be suppressed. The antenna apparatus 1 of the present embodiment is designed from the viewpoint of increasing the DU ratio in the detection angle range.

To increase the DU ratio in the detection angle range, as shown in FIG. 2, the transmission and reception composition gain is required to be increased as much as possible within the detection angle range and is required to be decreased as much as possible outside the detection angle range. As a result, even if the transmission and reception composition gain at a given angle outside the detection angle range is wrapped-around to the angle within the detection angle range as a false image due to grating, the transmission and reception composition gain due to the false image (transmission and reception composition gain of a undesired wave) can be made relatively and sufficiently smaller with respect to the original transmission and reception composition gain at the angle (transmission and reception composition gain of a desired wave), whereby the influence of the false image can be suppressed.

To make the transmission and reception composition gain larger as much as possible within the detection angle range, and make the transmission and reception composition gain smaller as much as possible outside the detection angle range, in the present embodiment, approaches are made individually for the transmitting antenna 30 and the receiving antenna 10 (20). Note that, in the following description, the configuration of only the receiving antenna 10 is described for the receiving antennas 10, 20 unless otherwise noted.

That is, as shown FIG. 2, although the directivity of the transmitting antenna (Tx) has a main lobe centering on the 0° direction, side lobes have a constant level. The constant side lobes are mainly due to undesired radiation from the transmitting-side feeding lines 35a, 35b. In the present embodiment, since both the antennas and the feeding lines are formed on the same surface of the dielectric substrate 5, the directivities of the antennas are influenced by the undesired radiation from the feeding lines. Hence, the side lobes of the directivity of the transmitting antenna 30 become a constant level, which is difficult to lower.

To decrease the transmission and reception composition gain outside the detection angle range, as shown in FIG. 3A, the directivity of the receiving antenna 10 may be narrowed as a whole (the beam width may be narrowed). When the directivity of the receiving antenna 10 is narrowed, the gain within the detection angle range is also slightly decreased. However, since the gain outside the detection angle range is relatively decreased greatly, the DU ratio is improved as a consequence.

To narrow the directivity of the receiving antenna 10 as a whole, the receiving-side arrangement interval Dr, which is the interval between the receiving-side unit antennas 11, 12 configuring the receiving antenna 10, may be larger. As the receiving-side arrangement interval Dr becomes larger, the directivity of the receiving antenna 10 becomes narrower.

Meanwhile, to increase the transmission and reception composition gain within the detection angle range, as shown in FIG. 3B, the directivity of the transmitting antenna 30 may be broadened as a whole (the beam width may be broadened). When the directivity of the transmitting antenna 30 is broadened, the gain within the detection angle range is increased. As a consequence, the DU ratio is improved.

Note that, as shown in FIG. 3B, when the directivity of the transmitting antenna 30 is broadened, the gain outside the detection angle range is also slightly increased. However, since the amount of the gain increased outside the detection angle range due to the broadened directivity of the transmitting antenna 30 is smaller than the amount of the gain decreased outside the detection angle range due to the narrowed beam of the receiving antenna 10 (refer to FIG. 3A), the gain outside the detection angle range is decreased relatively (as a consequence).

To broaden the directivity of the transmitting antenna 30, the transmitting-side arrangement intervals Dt, which are intervals between the transmitting-side unit antennas 31, 32, 33, 34 configuring the transmitting antenna 30, may be made smaller. As the transmitting-side arrangement intervals Dt become smaller, the directivity of the transmitting antenna 30 is broadened greatly. Note that if the directivity of the transmitting antenna 30 is excessively broadened, the gain outside the detection angle range is also increased to the extent corresponding to the broadened directivity. Hence, the gain of the receiving antenna 10 may be considered to determine the extent of broadening the directivity (i.e. the extent of decreasing the transmitting-side arrangement intervals Dt) so that the DU ratio within the detection angle range becomes equal to or more than a desired level.

Thus, in the present embodiment, by meeting the condition of the expression (1), that is, by making the receiving-side arrangement interval Dr larger than the transmitting-side arrangement interval Dt, the transmission and reception composition gain within the detection angle range becomes relatively larger than the transmission and reception composition gain outside the detection angle range, whereby the DU ratio within the detection angle range becomes larger.

Figure 4A:
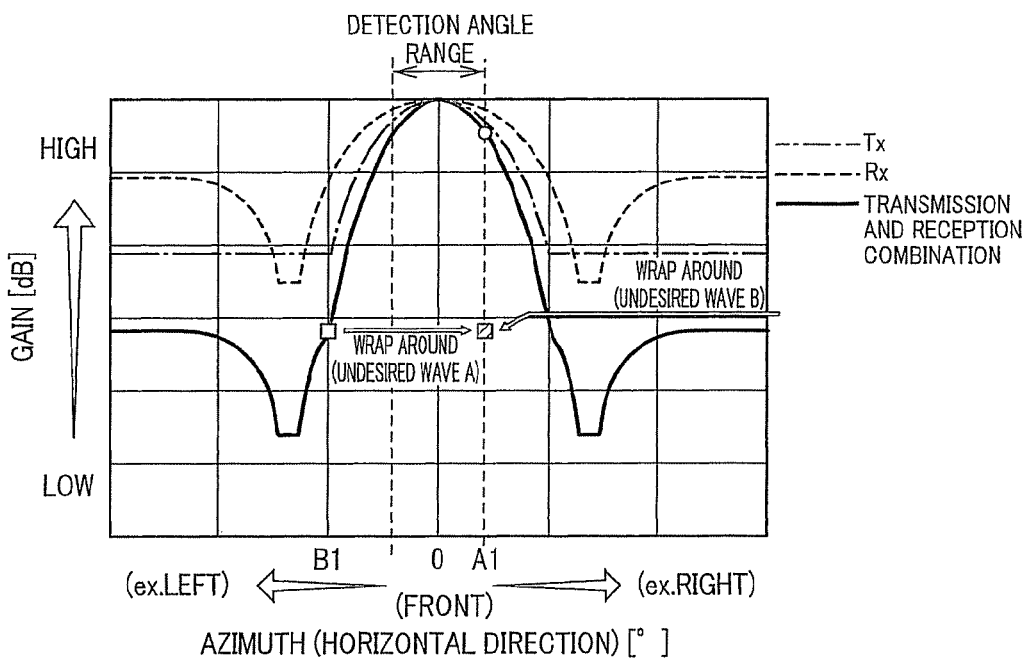
FIGS. 4A and 4B are views showing an example of characteristics of the antenna apparatus of the embodiment.
Figure 4B:
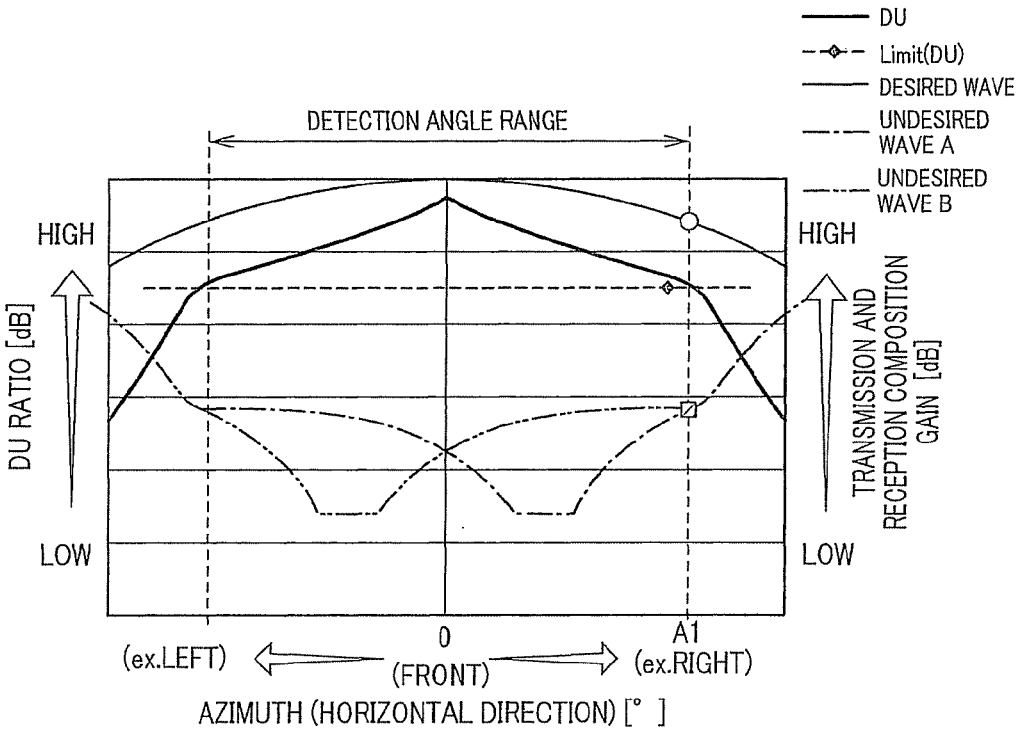

FIGS. 4A and 4B show an example of characteristics of the antenna apparatus 1 of the present embodiment. FIG. 4A shows the directivity of the transmitting antenna (Tx) 30, the directivity of the receiving antenna (Rx) 10, and the transmission and reception composition directivity. As shown in FIG. 4A, the main lobe of the transmission and reception composition directivity includes the whole range of the detection angle range.

In addition, FIG. 4B shows an accurate analysis of the transmission and reception composition gain and the DU ratio. That is, FIG. 4B shows a transmission and reception composition directivity (thin solid line in FIG. 4B) of a desired wave which is the transmission and reception composition directivity shown in FIG. 4A, a transmission and reception composition directivity (alternate long and short dash line in FIG. 4B) of a undesired wave A corresponding to a false image wrapped-around from the left side by the phase wrap around, a transmission and reception composition directivity (alternate long and two short dashes line in FIG. 4B) of a undesired wave B corresponding to a false image wrapped-around from the right side by the phase wrap around, and a DU ratio (thick solid line in FIG. 4B) which is a ratio of the sum of the undesired waves A and B to a desired wave.

In addition, FIG. 4B shows a DU ratio threshold value (limit), which serves as a criterion for determining the DU ratio. The DU ratio threshold value has been set to a value, by which the influence of a false image is suppressed to sufficiently prevent erroneous detection if a DU ratio is equal to or larger than the DU ratio threshold value.

As shown in FIG. 4A, for example, at an angle A1 positioned on one side (right side) in the detection angle range, not only the original transmission and reception composition gain (i.e. transmission and reception composition gain of a desired wave) at the angle A1 but also the transmission and reception composition gain of the false image due to grating (phase wrap around) is added. Specifically, the transmission and reception composition gain at a predetermined angle B1 positioned at the left side of the angle A1 is wrapped around to the angle A1 due to the grating. In addition, the transmission and reception composition gain at a predetermined angle positioned at the right side of the angle A1 is also wrapped around to the angle A1 due to the grating.

Hence, as shown in FIG. 4B in detail, the transmission and reception composition gain at the angle A1 is obtained by superimposing the gains of the undesired waves A and B on the gain of a desired wave.

Note that since the antenna apparatus 1 of the present embodiment is configured so as to meet the conditions of the expressions (1) and (2), the DU ration is equal to or larger than the DU ratio threshold value also at the angle A1. That is, the antenna apparatus 1 of the present embodiment has a DU ratio equal to or larger than the DU ratio threshold value over the detection angle range.

Therefore, according to the antenna apparatus 1 of the present embodiment, the influence of the phase wrap around (false image) is suppressed at least in the detection angle range to detect an azimuth with high precision by a simple (low cost) configuration meeting the conditions of the expressions (1) and (2).

In addition, in the present embodiment, the antennas and the feeding lines are formed on the same surface of the dielectric substrate 5. Hence, it is difficult to sufficiently lower the side lobes due to the influence of the undesired radiation from the feeding lines. However, even by such a configuration, the DU ratio can be increased as a consequence. Therefore, the influence of the phase wrap around can be suppressed to detect an azimuth with high precision In addition, each of the unit antennas is formed by arranging a plurality of radiating elements in the vertical direction. Hence, regarding the vertical-plane directivity (i.e. the directivity of a surface parallel to the vertical direction and perpendicular to a surface of the dielectric substrate 5 on which the radiating elements are formed), the directivity (gain) in the normal direction with respect to the surface of the dielectric substrate 5 can be the highest, while the directivity can be lowered as the angular difference between the directivity and the normal direction is increased (i.e. as the angle between the directivity and the surface of the dielectric substrate 5 becomes smaller). Hence, for example, in the case where only radio waves radiated from the inside of a predetermined angular range including the normal direction are required to be favorably received while radio waves radiated from the outside of the angular range are required to be suppressed from being received, the antenna apparatus 1 of the present embodiment can effectively be used.

It will be appreciated that the present invention is not limited to the configurations described above, but any and all modifications, variations or equivalents, which may occur to those who are skilled in the art, should be considered to fall within the scope of the present invention.

(Modifications)

For example, in the present embodiment, the antenna apparatus 1 has a configuration which meets both the expressions (1) and (2). However, the antenna apparatus 1 may have a configuration which meets only the expression (1). Note that, the configuration which meets both the expressions (1) and (2) is more preferable.

In addition, the number of the receiving antennas (the number of channels) is not limited to two, and may be three or more. In the above embodiment, the number of the receiving-side unit antennas configuring one receiving antenna is two. However, the number of the receiving-side unit antennas may be three or more.

In the above embodiment, the transmitting antenna is configured with four transmitting-side unit antennas. However, the number of the transmitting-side unit antennas can appropriately be determined. Note that, to meet both the expressions (1) and (2), the number of the transmitting-side unit antennas is required to be three or more.

In addition, in the above embodiment, the antenna apparatus 1 is shown in which the antennas and the feeding lines are formed on the same surface of the dielectric substrate 5. However, the antenna apparatus may have a configuration in which the feeding lines are not formed on the surface on which the antennas are formed (i.e. there is little or no influence of the undesired radiation).

Hereinafter, aspects of the above-described embodiments will be summarized.

As an aspect of the embodiment, an antenna apparatus is provided which includes a transmitting antenna and a plurality of receiving antennas. The antenna apparatus is used for an azimuth detection apparatus, in which each of the receiving antennas receives radio waves transmitted from the transmitting antenna and reflected by an object (target) and an azimuth of the object is detected based on a phase difference between received signals.

The transmitting antenna includes a plurality of transmitting-side unit antennas arranged in a predetermined arranging direction at predetermined transmitting-side arrangement intervals. The plurality of receiving antennas are arranged in the arranging direction at predetermined arrangement intervals. Each of the receiving antennas includes a plurality of receiving-side unit antennas arranged in the arranging direction at predetermined receiving-side arrangement intervals. The receiving-side arrangement interval is larger than the transmitting-side arrangement interval.

In general, when evaluating a characteristic of an antenna apparatus configuring a radar apparatus, a transmission and reception composition characteristic (transmission and reception composition gain) is often used which is the combination of the directivity (gain) of the transmitting antenna and the directivity (gain) of the receiving antenna. In addition, as a conventional design approach for suppressing the influence of a false image due to the phase wrap around, importance is generally given to decreasing the transmission and reception composition gain outside the detection angle range (i.e. decreasing the level of a false image).

In contrast, in the embodiment, importance is given to the fact that even when some false images exist at a given angle within the detection angle range, the influence of the false image can be suppressed if the transmission and reception composition gain of essential transmission and reception radio waves (referred to as "desired wave") at the angle is relatively high with respect to the false image. That is, importance is given to the fact that a relation (ratio) between the desired wave and the false image should be made larger without focusing on suppressing the level of the false image.

Note that, in the embodiment, the transmission and reception composition gain generated by the phase wrap around (false image) at a given angle within the detection angle range is explained, for the sake of convenience, assuming that the transmission and reception composition gain is generated by transmitting and receiving an imaginary radio wave different from the above desired wave at the angle. The imaginary radio wave is referred to as "undesired wave".

The ratio of an essentially desired radio wave (desired wave) to a undesired radio wave (undesired wave) is generally known as a DU ratio (Desired to Undesired Signal ratio). If an antenna apparatus can be realized so that the DU ratio becomes larger, the influence of phase wrap around can be suppressed.

It is noted that narrowing the directivity of the receiving antenna (narrowing the beam width as a whole) can decrease the transmission and reception composition gain outside the detection angle range, while broadening the directivity of the transmitting antenna (broadening the beam width as a whole) can increase the transmission and reception composition gain within the detection angle range, whereby the DU ratio can be increased.

To realize the increase of the DU ratio, each of the receiving antennas is configured with a plurality of receiving-side unit antennas arranged at receiving-side arrangement intervals. That is, one receiving antenna is configured by arranging the plurality of receiving-side unit antennas at receiving-side arrangement intervals. In addition, the receiving antennas are arranged at predetermined arrangement intervals. Furthermore, the intervals of the receiving-side unit antennas configuring the receiving antennas (receiving-side arrangement intervals) are determined so as to be larger than the intervals of the transmitting-side unit antennas configuring the transmitting antennas (transmitting-side arrangement intervals).

As the receiving-side arrangement intervals become larger, the beam width of the receiving antenna can be narrower. As the transmitting-side arrangement intervals become smaller, the beam width of the transmitting antenna can be broader. Hence, the transmission and reception composition gain of the main lobe can be higher, while that of the side lobes can be lower.

Hence, for example, if a predetermined angle range in a main beam is determined as a detection angle range, a high DU ratio can be obtained within the detection angle range.

Hence, according to the above antenna apparatus, the influence of phase wrap around (false image) at least in a detection angle range which is an angle range for a detection object of an azimuth can be suppressed to detect an azimuth with high precision by a simple (low cost) configuration.

In addition, the arrangement intervals may be determined as below. That is, a transmission and reception composition characteristic, which is a composition of the directivity of the transmitting antenna and the directivity of the receiving antenna, has a main lobe including at least the whole of a predetermined detection angle range. The transmitting-side arrangement interval and the receiving-side arrangement interval are determined so that, at least in the whole of the detection angle range, a ratio (i.e. DU ratio) of the intensity of the main lobe of the transmission and reception composition characteristic at a given angle in the detection angle range to the intensity of the transmission and reception composition characteristic generated as a false image at the angle by wrap around at the angle due to grating becomes equal to or more than a predetermined threshold value.

According to the antenna apparatus configured as described above, since the DU ratio is equal to or larger than the predetermined threshold value at least in the detection angle range, the influence of a false image can reliably be suppressed at least in the detection angle range, thereby reliably suppressing erroneous detection due to the false image when the antenna apparatus is applied to a radar apparatus.

Next, in the antenna apparatus, both of the transmitting antenna and the receiving antennas are formed of strip conductors and on one surface of a dielectric substrate. A transmitting-side feeding line and a receiving-side feeding line are formed of strip conductors on the one surface so that power is fed to the transmitting antenna via the transmitting-side feeding line and to the receiving antennas via the receiving-side feeding line.

According to the configuration in which the antennas and the feeding lines are formed on the same surface of the dielectric substrate, side lobes of the antennas become larger due to the influence of undesired radiation from the feeding lines, whereby the transmission and reception composition gain at side lobe sides becomes larger.

In such a case, it is difficult to increase the DU ratio within a desired detection angle range only by the approach of decreasing the level of side lobes as in a conventional art. However, according to the embodiment, the DU ratio can be increased by the technological thought that the receiving-side arrangement interval is determined so as to be relatively larger than the transmitting-side arrangement interval. Hence, even by the configuration in which the antennas and the feeding lines are formed on the same surface of the dielectric substrate, as described above, an azimuth can be detected with high precision while suppressing the influence of phase wrap around.

In the antenna apparatus, each of the transmitting-side unit antennas and each of the receiving-side unit antennas are formed of a plurality of radiating elements arranged in the direction orthogonal to the arranging direction.

As described above, configuring each of the transmitting-side and receiving-side unit antennas by arranging the plurality of radiating elements in the direction (also referred to as "elements arranging direction") orthogonal to the arranging direction (also referred to as "antennas arranging direction") can make narrow the transmission and reception directivity. That is, a plane, which is perpendicular to the plane including the antennas arranging direction and the elements arranging direction (i.e. a plane on which the radiating elements are arranged, also referred to as "elements arranging plane") and is parallel to the elements arranging direction, is determined as an arranging direction vertical plane, thereby narrowing the directivity of the arranging direction vertical plane. More specifically, the directivity (gain) in the normal direction of the elements arranging plane of the directivity of the arranging direction vertical plane can be made to be highest, while the directivity can be lowered as the angular difference between the directivity and the normal direction is increased (i.e. as the angle between the directivity and the elements arranging plane becomes smaller). Hence, for example, in the case where only radio waves radiated from the inside of a predetermined angular range including the normal direction are required to be favorably received while radio waves radiated from the outside of the angular range are required to be suppressed from being received, the antenna apparatus of the embodiment can effectively be used because undesired radio waves radiated from outside of the angular range can be suppressed.

What is claimed is:

1. An antenna apparatus comprising:
   a transmitting antenna and a plurality of receiving antennas, the antenna apparatus being used for an azimuth detection apparatus, in which each of the receiving antennas receives radio waves transmitted from the transmitting antenna and reflected by an object, and an azimuth of the object is detected based on a phase difference between received signals, wherein
   the transmitting antenna includes a plurality of transmitting-side unit antennas arranged in a predetermined arranging direction at predetermined transmitting-side arrangement intervals,
   the plurality of receiving antennas are arranged in the predetermined arranging direction at predetermined arrangement intervals,
   each of the receiving antennas includes a plurality of receiving-side unit antennas arranged in the predetermined arranging direction at predetermined receiving-side arrangement intervals,
   the receiving-side arrangement interval is larger than the transmitting-side arrangement interval,
   a width of the transmitting antenna is measured along an axis parallel with the predetermined arranging direction,
   the receiving-side arrangement interval is less than the width of the transmitting antenna,
   both the transmitting antenna and the receiving antennas are formed of strip conductors and on one surface of a dielectric substrate,
   a transmitting-side feeding line and a receiving-side feeding line are formed of strip conductors on the one surface so that power is fed to the transmitting antenna via the transmitting-side feeding line and to the receiving antennas via the receiving-side feeding line,
   each of the transmitting-side unit antennas and each of the receiving-side unit antennas is formed of a plurality of radiating elements that have a rectangular shape and are arranged in a direction orthogonal to the arranging direction,
   each of the radiating elements of the transmitting-side unit antennas have a first side and a second side shorter than the first side, wherein the first side extends in a first direction and the second side is opposite to the transmitting-side feeding line,
   each of the radiating elements of the receiving-side unit antennas has a first side and a second side shorter than the first side, wherein the first side extends in a second direction opposite to the first direction and the second side is opposite to the receiving-side feeding line, and a transmission and reception composition characteristic, which is a composition of a directivity of the transmitting antenna and a directivity of the receiving antenna, has a main lobe including at least the whole of a predetermined detection angle range, and the transmitting-side arrangement interval and the receiving-side arrangement interval are determined so that, in the whole of the detection angle range, a ratio of the intensity of the main lobe of the transmission and reception composition characteristic at a given angle in the detection angle range to the intensity of the transmission and reception composition characteristic generated as a false image at the angle by wrap around at the angle due to grating becomes equal to or more than a predetermined threshold value.

2. An antenna apparatus comprising:

a transmitting antenna and a plurality of receiving antennas, the antenna apparatus being used for an azimuth detection apparatus, in which each of the receiving antennas receives radio waves transmitted from the transmitting antenna and reflected by an object, and an azimuth of the object is detected based on a phase difference between received signals; and both the transmitting antenna and the receiving antenna are formed of strip conductors and on one surface of a dielectric substrate, a transmitting-side feeding line and a receiving-side feeding line formed of strip conductors on the one surface such that power is fed to the transmitting antenna via the transmitting-side feeding line and to the receiving antennas via the receiving-side feeding line, wherein:

the transmitting antenna includes a plurality of transmitting-side unit antennas arranged in a predetermined arranging direction at a predetermined transmitting-side arrangement interval, each of the transmitting-side unit antennas is formed of a plurality of transmitting radiating elements that have a rectangular shape and are arranged in a direction orthogonal to the predetermined arranging direction, wherein a first side of each of the plurality of radiating elements is directed in a first direction and a second side of each of the plurality of radiating elements is opposite to the transmitting-side feeding line, and the first side is longer than the second side, the plurality of receiving antennas are arranged in the predetermined arranging direction at a predetermined arrangement interval, each of the receiving antennas includes a plurality of receiving-side unit antennas arranged in the predetermined arranging direction at a predetermined receiving-side arrangement interval, each of the receiving-side unit antennas is formed of a plurality of receiving radiating elements that have a rectangular shape and are arranged in the direction orthogonal to the predetermined arranging direction, wherein a first side of each of the plurality of receiving radiating elements is directed in a second direction that is opposite to the first direction, a second side of each of the plurality of radiating elements is opposite to the receiving-side feeding line, and the first side is longer than the second side, a width of the transmitting antenna is measured along an axis parallel with the predetermined arranging direction, and the receiving-side arrangement interval is less than the width of the transmitting antenna and is greater than the transmitting-side arrangement interval.

* * * * *